United States Patent
Harada (10) Patent No.: US 10,145,945 B2
(45) Date of Patent: Dec. 4, 2018

(54) SYSTEMS AND METHODS FOR AUTOMATICALLY CALIBRATING A LIDAR USING INFORMATION FROM A SECONDARY VEHICLE

(71) Applicant: Toyota Research Institute, Inc., Los Altos, CA (US)

(72) Inventor: Masahiro Harada, Novi, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 53 days.

(21) Appl. No.: 15/403,585

(22) Filed: Jan. 11, 2017

(65) Prior Publication Data

US 2018/0196127 A1    Jul. 12, 2018

(51) Int. Cl.
| B60R 21/015 | (2006.01) |
| G01S 7/497 | (2006.01) |
| G01C 21/16 | (2006.01) |
| G08G 1/16 | (2006.01) |
| G01S 17/93 | (2006.01) |

(52) U.S. Cl.
CPC .......... *G01S 7/4972* (2013.01); *G01C 21/165* (2013.01); *G01S 17/93* (2013.01); *G08G 1/161* (2013.01)

(58) Field of Classification Search
CPC ..... G01S 7/4972; G01S 17/93; G01C 21/165; G08G 1/161
USPC .................................. 701/33, 33.1; 356/4.01
See application file for complete search history.

(56) References Cited

U.S. PATENT DOCUMENTS

| 9,423,256 | B2* | 8/2016 | Le Scouarnec | G01C 21/165 |
| 2014/0240690 | A1* | 8/2014 | Newman | G01S 7/4808 356/4.01 |
| 2015/0012172 | A1* | 1/2015 | Hegemann | G01S 13/862 701/33.1 |
| 2015/0161830 | A1* | 6/2015 | Lenhardt | G01K 13/00 701/30.5 |
| 2015/0362587 | A1* | 12/2015 | Rogan | G01S 17/89 702/104 |
| 2016/0129917 | A1* | 5/2016 | Gariepy | G05D 1/0011 701/2 |

(Continued)

OTHER PUBLICATIONS

Taylor, Zachary, and Juan Nieto. "Automatic calibration of lidar and camera images using normalized mutual information." Robotics and Automation (ICRA), 2013 IEEE International Conference on. 2013.

(Continued)

*Primary Examiner* — Shardul D Patel
(74) *Attorney, Agent, or Firm* — Christopher G. Darrow; Darrow Mustafa PC (57) ABSTRACT

System, methods, and other embodiments described herein relate to calibrating a sensor of a first vehicle. In one embodiment, a method includes, in response to detecting that a second vehicle is proximate to the first vehicle, acquiring perceived information from the sensor about the second vehicle. The method includes comparing the perceived information with vehicle information to generate an offset that characterizes a variance within the perceived information produced by the sensor. The vehicle information identifies known characteristics of the second vehicle. The method includes adjusting the sensor according to the offset to correct the variance of the sensor.

20 Claims, 6 Drawing Sheets

(56) References Cited

U.S. PATENT DOCUMENTS

2017/0178498 A1* 6/2017 Mcerlean ............... B60K 35/00
2018/0053413 A1* 2/2018 Patil ........................ G01S 11/14

OTHER PUBLICATIONS

Pandey, Gaurav, et al. "Automatic Targetless Extrinsic Calibration of a 3D Lidar and Camera by Maximizing Mutual Information." AAAI. 2012.

Bileschi, S. "Fully automatic calibration of LIDAR and video streams from a vehicle." Computer Vision Workshops (ICCV Workshops), 2009 IEEE 12th International Conference on. 2009. 1457-1464.

* cited by examiner

SYSTEMS AND METHODS FOR AUTOMATICALLY CALIBRATING A LIDAR USING INFORMATION FROM A SECONDARY VEHICLE

TECHNICAL FIELD

The subject matter described herein relates in general to systems for calibrating a LIDAR sensor and, more particularly, to using secondary vehicles within an environment as references to automatically calibrate the LIDAR sensor.

BACKGROUND

LIDAR sensors are valuable tools for obtaining information about surroundings in an environment such as distances to various objects, identities of objects, and so on. Consequently, LIDAR sensors are becoming more common in vehicles and especially in autonomous vehicles. However, while LIDAR sensors can be highly accurate and useful for identifying objects, these sensors are also subject to errors. For example, when a LIDAR sensor is first manufactured a calibration process is generally undertaken to adjust the operation of the sensor and ensure proper alignment. As the LIDAR sensor is used, various environmental conditions (e.g., vibrations, temperature changes, etc.) can cause the LIDAR sensor to drift out of alignment.

However, calibrating the LIDAR sensor can be a complex task. For example, various methods for calibrating generally include using a pre-established environment that includes static markers with known and tested attributes (e.g., distances and shapes). Thus, this established environment needs to be separately maintained so that the LIDAR can be calibrated. Consequently, calibrating the LIDAR sensor can introduce costs from maintaining the static location. Accordingly, a likelihood that the sensors will be calibrated on a regular basis is lessened because of difficulties with accessing such static locations.

SUMMARY

An example of a calibration system is presented herein. In one embodiment, the calibration system automatically and periodically calibrates a LIDAR sensor using vehicles within an external environment of a vehicle that is equipped with the LIDAR. For example, as the equipped vehicle travels along a road, the calibration system detects the presence of a secondary vehicle that is capable of assisting the calibration system with calibrating the LIDAR sensor. In other words, the calibration system identifies that the secondary vehicle is of a particular type and/or capable of communicating calibration information that can assist in the calibration process. Consequently, the calibration system acquires vehicle information about the secondary vehicle while also using the LIDAR sensor to generate perceived data (e.g., a 3D point cloud) about the secondary vehicle. The calibration system can then use the perceived information along with the vehicle information to calibrate the LIDAR sensor. In this way, the calibration system uses nearby vehicles as references to calibrate the LIDAR sensor without a need for a static calibration location.

In one embodiment, a calibration system for calibrating a sensor of a first vehicle is disclosed. The calibration system includes one or more processors and a memory that is communicably coupled to the one or more processors. The memory stores a capture module that includes instructions that when executed by the one or more processors cause the one or more processors to, in response to detecting that a second vehicle is proximate to the first vehicle, acquire perceived information from the sensor about the second vehicle. The memory stores a calibration module including instructions that when executed by the one or more processors cause the one or more processors to compare the perceived information with vehicle information to generate an offset that characterizes a variance within the perceived information produced by the sensor. The vehicle information identifies known characteristics of the second vehicle. The calibration module includes instructions to adjust the sensor according to the offset to correct the variance of the sensor.

In one embodiment, a non-transitory computer-readable medium for calibrating a sensor of a first vehicle is disclosed. The computer-readable medium stores instructions that when executed by one or more processors cause the one or more processors to perform the disclosed functions. The instructions include instructions to, in response to detecting that a second vehicle is proximate to the first vehicle, acquire perceived information from the sensor about the second vehicle. The instructions include instructions to compare the perceived information with vehicle information to generate an offset that characterizes a variance within the perceived information produced by the sensor. The vehicle information identifies known characteristics of the second vehicle. The instructions include instructions to adjust the sensor according to the offset to correct the variance of the sensor.

In one embodiment, a method of calibrating a sensor of a first vehicle is disclosed. The method includes, in response to detecting that a second vehicle is proximate to the first vehicle, acquiring perceived information from the sensor about the second vehicle. The method includes comparing the perceived information with vehicle information to generate an offset that characterizes a variance within the perceived information produced by the sensor. The vehicle information identifies known characteristics of the second vehicle. The method includes adjusting the sensor according to the offset to correct the variance of the sensor.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with dynamically calibrating a LIDAR sensor are disclosed. As mentioned previously, calibrating a LIDAR may be a tedious process that uses an established location with specifically arranged elements for calibrating the LIDAR. Thus, the ability to calibrate the LIDAR sensor can be constrained to the noted locations, which results in difficulties due to such locations being unavailable. Consequently, the LIDAR may be calibrated less frequently resulting in a reduced accuracy.

Accordingly, in one embodiment, a vehicle that is equipped with a LIDAR sensor also includes a calibration system for automatically calibrating the LIDAR sensor without a need for a pre-established calibration location. That is, the calibration system is implemented to perform calibration on-the-fly while the vehicle is traveling along a roadway and without using a pre-established location. In one embodiment, the calibration system is implemented to acquire perceived information about a nearby vehicle using the LIDAR sensor and acquire vehicle information about the nearby vehicle using a separate sensor (e.g., a camera) or by communicating directly with the nearby vehicle through, for example, vehicle-to-vehicle (V2V) communications. In either case, the calibration system uses the perceived information acquired by the LIDAR in comparison with the vehicle information about the nearby vehicle to produce calibration measurements. The calibration system can then use the calibration measurements to calibrate the LIDAR thereby maintaining the accuracy of the LIDAR and thus improving, for example, autonomous operation of the vehicle.

Figure 1:
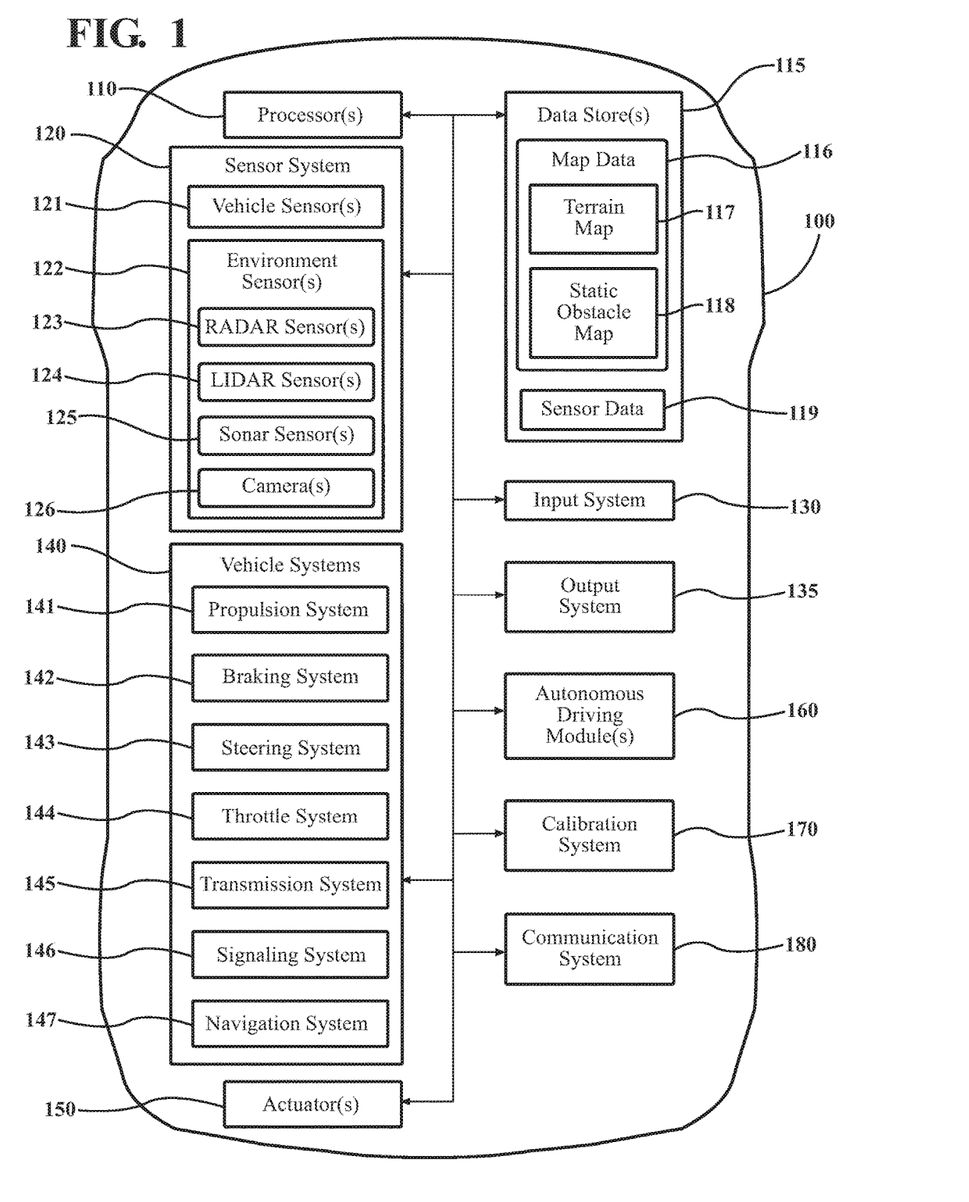
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, includes a LIDAR or similar sensor and thus benefits from the automatic calibrating functionality as discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a calibration system 170 that is implemented to perform methods and other functions as disclosed herein relating to automatically calibrating a sensor using information about nearby vehicles. The noted functions and methods will become more apparent with a further discussion of the figures.

Figure 2:
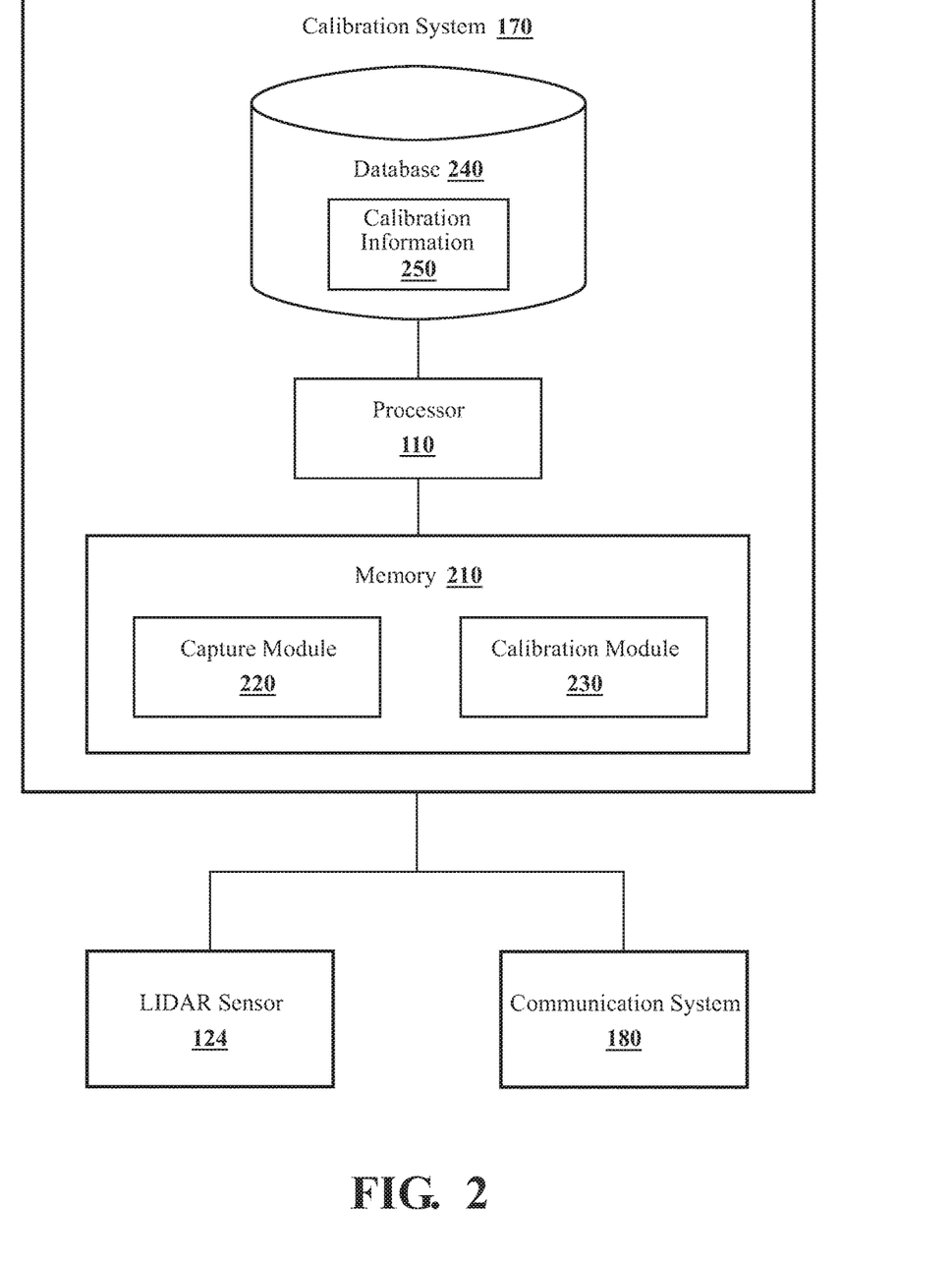
FIG. 2 illustrates one embodiment of a calibration system that is associated with automatically calibrating a LIDAR sensor.

With reference to FIG. 2, one embodiment of the calibration system 170 of FIG. 1 is further illustrated. The calibration system 170 is shown as including a processor 110 from the vehicle 100 of FIG. 1. Accordingly, the processor 110 may be a part of the calibration system 170, the calibration system 170 may include a separate processor from the processor 110 of the vehicle 100, or the calibration system 170 may access the processor 110 through a data bus or another communication path. In one embodiment, the calibration system 170 includes a memory 210 that stores a capture module 220 and a calibration module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the capture module 220 generally includes instructions that function to control the processor 110 to retrieve data from sensors of a sensor system 120 of the vehicle 100. In other words, the capture module 220 includes instructions to acquire data from a LIDAR sensor 124, a camera 126, a communication system 180, and so on. In one embodiment, the capture module 220 acquires at least two forms of data to calibrate the LIDAR 124. The capture module 220 acquires, for example, perceived information from the LIDAR 124 and also vehicle information. The perceived information is data produced by the LIDAR 124 in response to, for example, a request from the capture module 220. Thus, the perceived information is generally in the form of a three-dimensional point cloud of the nearby vehicle. Moreover, the LIDAR 124 generally produces the perceived information according to a current calibration state. That is, for example, if the LIDAR 124 is presently out of alignment and not properly calibrated, then the perceived information can include inaccuracies that are variances in measurements from real-world measurements.

Additionally, the capture module 220 can determine the vehicle information in multiple different ways depending on a particular implementation. In one embodiment, the capture module 220 communicates with a nearby vehicle to obtain the vehicle information using vehicle-to-vehicle (V2V) communications. Thus, the capture module 220 can control the communication system 180 to query the nearby vehicle for the vehicle information and exchange communications with the nearby vehicle to acquire the vehicle information. Accordingly, the communication system 180 includes a wireless transceiver (e.g., wireless network interface card) to send and receive wireless communications with other vehicles.

In another embodiment, the capture module 220 acquires the vehicle information through alternative means such as by using a camera to identify and localize the nearby vehicle. Thus, the capture module 220, for example, controls the camera 126 to acquire an image of the nearby vehicle from which the capture module 220 determines the vehicle information. Accordingly, the capture module 220 uses, for example, identifying information stored in the database 240 to generate the vehicle information according to the image. The vehicle information generally includes a distance of the nearby vehicle from the vehicle 100 along with a shape of the nearby vehicle or information that can be used to identify the shape of the nearby vehicle. As will be discussed in greater detail subsequently, in one embodiment, the vehicle information is comprised of information from which a reference point cloud is generated or of the reference point cloud itself. The reference point cloud is a three-dimensional point cloud that is similar to a perceived point cloud produced from readings of the LIDAR sensor 124. However, the reference point cloud is, for example, a verified representation of the nearby vehicle and at a particular location from which references are possible to perform calibration measurements for the LIDAR 124.

In either case, together the perceived information and the vehicle information comprise calibration information 250 that is, in one embodiment, stored by the capture module 220 in the database 240. In one embodiment, the calibration module 230 includes instructions that function to control the processor 110 to calibrate the LIDAR 124 as a function of the calibration information 250. More particularly, the calibration module 230 determines, for example, an offset between the perceived information and the vehicle information to identify a variance of the LIDAR 124 from a calibrated state (i.e., a state where readings from the LIDAR 124 match actual reference points). Consequently, once the calibration module 230 determines the offset, the calibration module 230 can proceed to calibrate the LIDAR 124 by, for example, adjusting operating parameters of the LIDAR 124 to change how the LIDAR 124 perceives objects within an external environment.

With continued reference to the calibration system 170, in one embodiment, the system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes lookup tables of vehicle models/shape, the calibration information 250, and so on. The vehicle models are, for example, three-dimensional shapes (e.g., 3D point clouds) for various makes and models of vehicles.

The capture module 220, in one embodiment, uses the vehicle models to determine a shape of the nearby vehicle as identified by, for example, the vehicle information acquired from the nearby vehicle. Thereafter, the capture module 220 can use a model for the nearby vehicle to, for example, precisely determine distances between the vehicle 100 and the nearby vehicle. In one embodiment, the capture module 220 uses the determined model along with known yaw measurements and distance information to generate a reference point cloud. As noted, the reference point cloud is a calculated reference representation of the nearby vehicle that accurately represents a shape and distance of the nearby vehicle from the vehicle 100. Therefore, the calibration module 230 can use the reference point in comparison with the perceived point cloud to determine an offset for calibrating the LIDAR 124.

Figure 3:
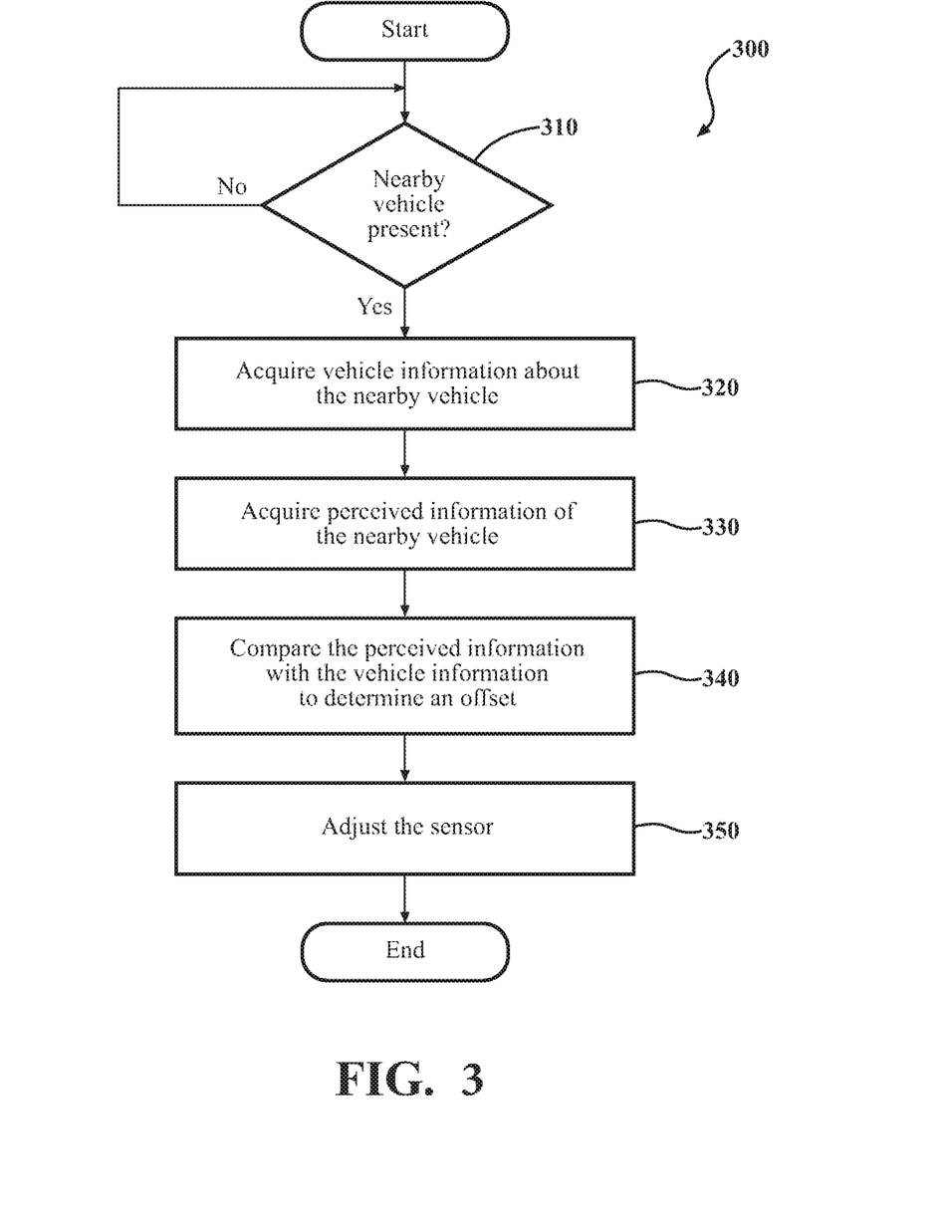
FIG. 3 illustrates one embodiment of a method that is associated with calibrating a LIDAR sensor automatically while a vehicle is in route.

Additional aspects of automatically calibrating a LIDAR sensor will be discussed in relation to FIG. 3. FIG. 3 illustrates a flowchart of a method 300 that is associated with automatically calibrating a LIDAR sensor on-the-fly. Method 300 will be discussed from the perspective of the calibration system 170 of FIGS. 1 and 2. While method 300 is discussed in combination with the calibration system 170, it should be appreciated that the method 300 is not limited to being implemented within the calibration system 170, but is instead one example of a system that may implement the method 300.

At 310, the calibration module 230 detects whether a second vehicle (also referred to as nearby vehicle herein) is proximate to the vehicle 100. In one embodiment, the calibration module 230 detects the second vehicle using V2V communications, using the LIDAR sensor 124, using the camera 126, or using another suitable means for detection. For example, the calibration module 230 uses the communication system 180 to monitor for a wireless beacon that is transmitted by the second vehicle and that indicates that the second vehicle is available to assist in calibrating the LIDAR 124. In another embodiment, the calibration module 230 detects the secondary vehicle by applying image recognition techniques to images generated by the camera 126.

Accordingly, detection of the nearby/second vehicle generally initiates the calibration process by causing the calibration system to proceed to block 320. It should be noted, that while the calibration system 170 is discussed as calibrating the LIDAR 124 whenever the second/nearby vehicle is detected, at 310, in various embodiments, different parameters may be set such that the calibration system 170 automatically calibrates the LIDAR 124 at different periods or upon a request from a user. For example, the calibration system 170 may calibrate the LIDAR 124 once per trip, once per defined number of miles, once per day, or according to another indicator such that the calibration system 170 maintains the LIDAR 124 within an acceptable threshold of variance to provide accurate data to the vehicle 100.

At 320, the capture module 220 acquires the vehicle information from the nearby vehicle. In one embodiment, the capture module 220 queries the nearby vehicle in response to detecting the beacon at 310. Accordingly, the capture module 220 can activate the communication system 180 to communicate with the nearby vehicle and obtain the vehicle information. In one embodiment, the capture module 220 causes the communication system 180 to send a wireless communication (e.g., V2V communication) according to a communication protocol (e.g., V2V protocol) that is a query for the vehicle information. Thus, the capture module 220 induces the nearby vehicle to provide the vehicle information by using the query.

Moreover, in response to the query, the capture module 220 obtains the vehicle information. The vehicle information may take different forms depending on the particular nearby vehicle, and/or capabilities of the vehicle 100. That is, in one embodiment, the vehicle information includes a GPS location of the nearby vehicle along with an indicator of a make model and a yaw measurement of the nearby vehicle. In alternative embodiments, the capture module 220 obtains a three-dimensional model of the nearby vehicle as part the vehicle information or obtains the model by using the identifying information (e.g., make and model) to execute a lookup on a stored library of models in the database 240 or through a wireless connection to a data network (e.g., the Internet).

Alternatively, as mentioned previously, the capture module 220 acquires the vehicle information using sensors of the vehicle 100 such as the camera 126, a radar 123 and/or another sensor other than the LIDAR 124. In this way, the calibration system 170 may obtain the vehicle information when, for example, the nearby vehicle does not support wireless communications (e.g., V2V), when the nearby vehicle is uniquely configured, and so on. In either case, the vehicle information provides a standard/reference against which to measure the perceived information. That is, the vehicle information is data about the nearby vehicle that is known to be accurate. Thus, the vehicle information is verified information that provides a basis for calibrating the LIDAR 124.

In one embodiment, the vehicle information identifies a relative location of the nearby vehicle in relation to the vehicle 100. Thus, the vehicle information identifies x, y, and z coordinates of the nearby vehicle in relation to the vehicle 100. Additionally, the vehicle information, in one embodiment, also indicates an orientation of the nearby vehicle with respect to the vehicle 100. That is, the vehicle information indicates a direction in which the nearby vehicle is facing. While the vehicle information is generally discussed as including the relative position information of the nearby vehicle, in one embodiment, the capture module 220 derives the relative position according to the vehicle information and from additional information such as a GPS location of the vehicle 100. In either case, the vehicle information provides an accurate relative position and orientation of the particular nearby vehicle from which calibrations of the LIDAR 124 may be made.

Moreover, as previously indicated, the vehicle information is, in one embodiment, a reference three-dimensional point cloud. Accordingly, the capture module 220 generates the reference point cloud from the vehicle information obtained from/about the nearby vehicle. Accordingly, the capture module 220 uses, for example, the model in addition to the yaw and GPS location to generate the reference point cloud. As such, the reference point cloud provides an accurate depiction of the nearby vehicle that can be substituted for a static pre-established calibration location. In this way, the calibration system 170 is capable of calibrating the LIDAR 124 while the vehicle 100 is traveling along a roadway and without using a static calibration location.

At 330, the capture module 220 acquires perceived information about the nearby vehicle. In one embodiment, the capture module 220 provides an electronic control signal to the LIDAR 124 that causes the LIDAR 124 to execute observations of the nearby vehicle. Accordingly, the capture module 220 obtains the perceived information from the LIDAR 124. The perceived information is, for example, a three-dimensional point cloud that is a set of data points identifying locations on a surface of the nearby vehicle as perceived by the LIDAR 124. Accordingly, each of the data points of the point cloud correlates with a perceived location of a separate point on the surface of the nearby vehicle. Moreover, because the LIDAR 124 generates the perceived point cloud, inaccuracies may be present because of the LIDAR 124 being out of alignment.

Additionally, the perceived point cloud is generally comprised of a plurality of data points that are generated from, for example, multiple different beams (e.g., 3, 5, 10, etc.) of the LIDAR 124 scanning the nearby vehicle. Therefore, separate calibrations may be performed for each separate beam as will be discussed subsequently.

At 340, the calibration module 230 compares the vehicle information with the perceived information to determine an offset. In one embodiment, the calibration module 230 compares data points from the reference point cloud against data points of the perceived point cloud as produced by the LIDAR 124. This comparison, at 340, generates, in one embodiment, an offset that identifies variances between data obtained by the LIDAR 124 and actual locations for the data points of the nearby vehicle. Furthermore, in one embodiment, the calibration module 230 produces the offset as an error map that identifies a difference between each point in the reference point cloud and the perceived point cloud. Accordingly, the calibration module 230 can use the error map to identify a variance for each beam of the LIDAR 124 and thus an amount of adjustment of distance and/or angle of the individual beams that is needed to calibrate the LIDAR 124.

At 350, the calibration module 230 adjusts the LIDAR 124 according to the offset. In one embodiment, the calibration module 230 adjusts operating parameters of the LIDAR sensor 124 to alter how the sensor 124 functions. That is, the calibration module 230 adjusts an alignment of the LIDAR sensor 124 by, for example, changing values of one or more registers that store the operating parameters. In one embodiment, the calibration module 230 adjusts a distance of the beams of the LIDAR 124 by modifying operating parameters that control an angle and/or an alignment segment for each of the beams. The alignment segment is a tunable distance associated with each of the beams. For example, each of the beams includes a base distance along with an alignment segment. The base distance is, for example, a primary focal distance or target distance for the LIDAR 124. Thus, the alignment segment is a portion of the beam that occurs after the base distance and can be adjusted by the calibration module 230 by modifying an angle and/or distance of the beam.

Figure 4:
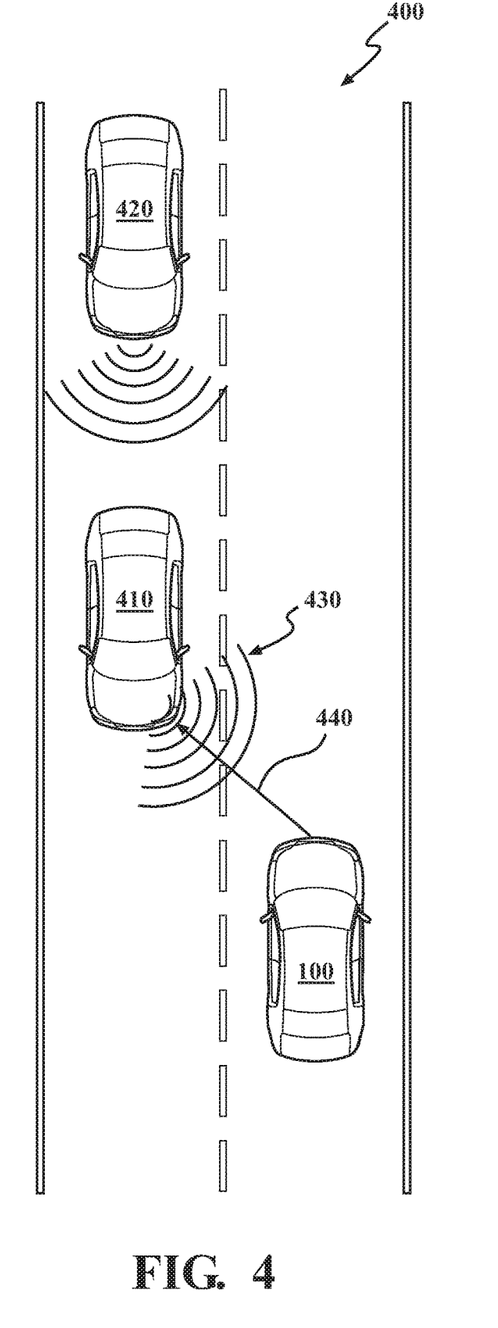
FIG. 4 illustrates a diagram of a roadway with a vehicle that is calibrating a LIDAR sensor.
Figure 5:
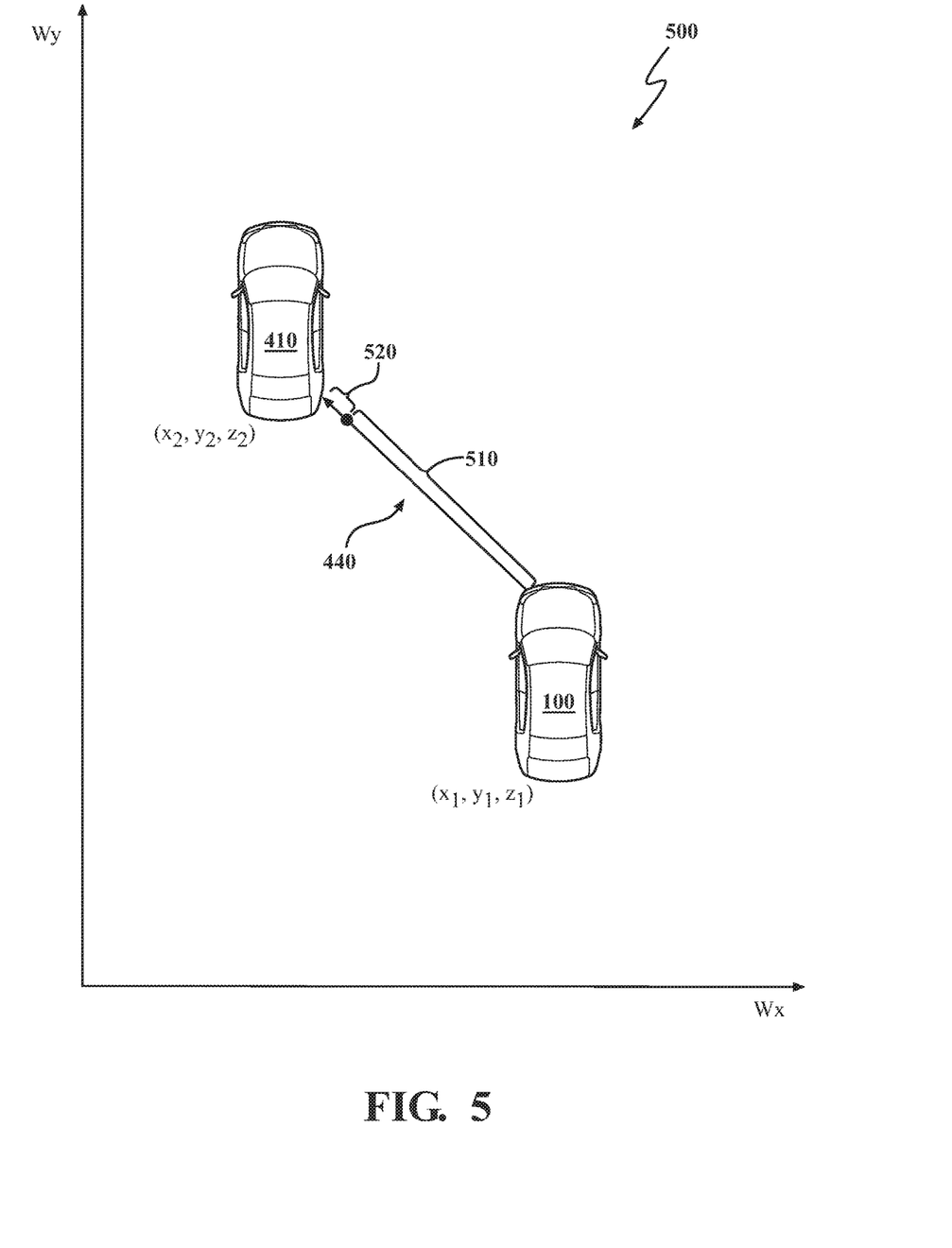
FIG. 5 illustrates a graph of relative positions of two vehicles.
Figure 6:
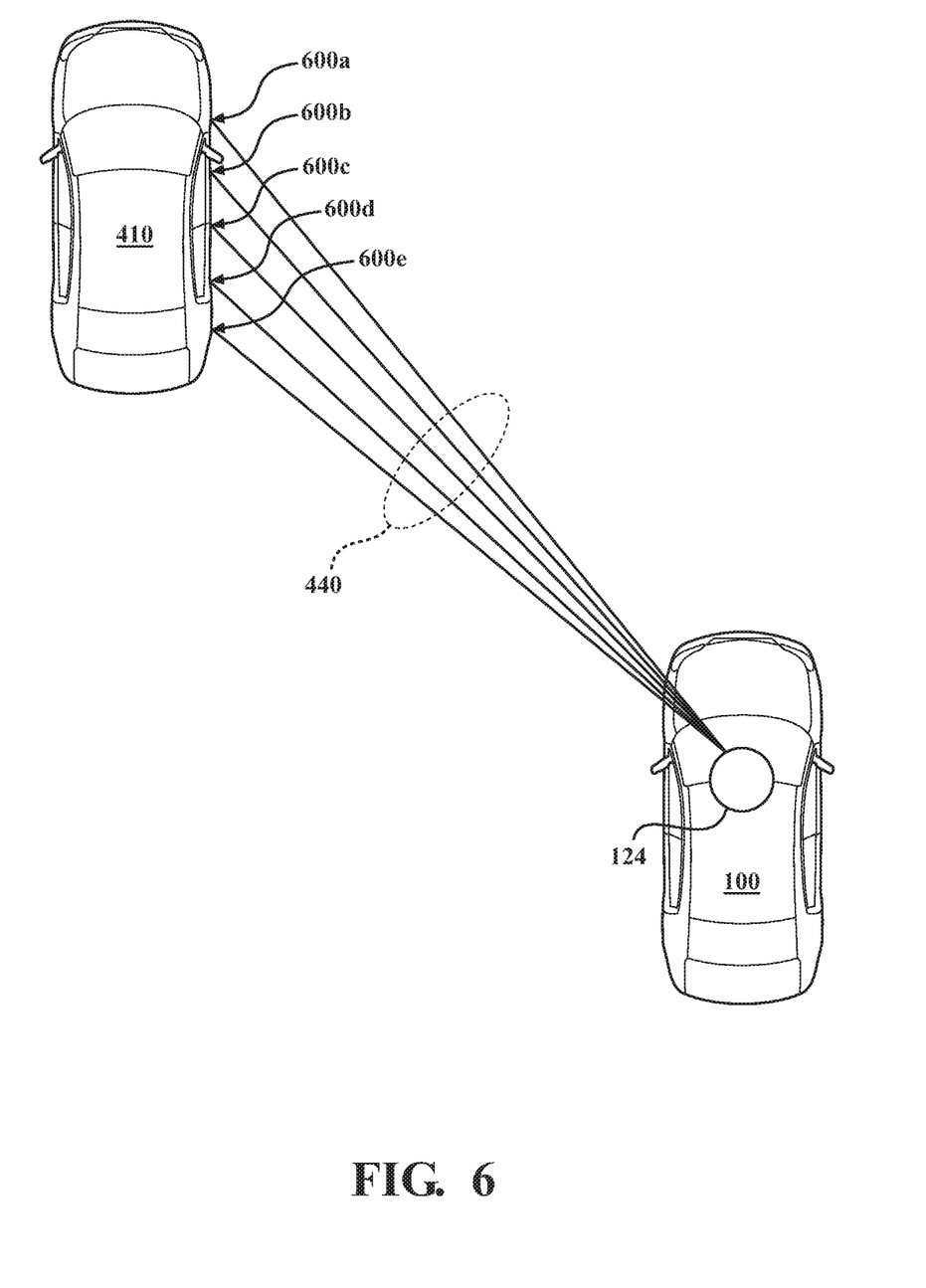
FIG. 6 illustrates a diagram of a first vehicle scanning a second vehicle with a LIDAR sensor.

As one example of how the calibration system 170 operates consider the example illustrated in FIGS. 4-6. FIG. 4 illustrates a schematic diagram of a roadway 400 on which the vehicle 100 is traveling. Accordingly, as the vehicle 100 travels along the roadway 400, the calibration module 230 detects different vehicles, e.g., vehicles 410 and/or 420. In the example illustrated in FIG. 4, the calibration module 230 detects the vehicle 410 via a wireless beacon 430 that is provided according to a V2V protocol over a wireless channel. In one embodiment, the calibration module 230 controls the communication system 180 to monitor for the beacon and provide a control signal upon detecting the beacon 430.

In either case, the calibration module 230 detects the vehicle 410 and initiates the capture module 220 to acquire both the perceived information and the vehicle information about the nearby vehicle 410. As previously discussed at blocks 320 and 330 of method 300, the capture module 220 obtains both the perceived information and the vehicle information so that the calibration module 230 can generate the offset from which the LIDAR 124 is subsequently calibrated. As shown in FIG. 4, the capture module 220 acquires the vehicle information through a wireless communication channel that is established between the vehicles 100 and 410 upon detection of the beacon 430.

Accordingly, the capture module 220 acquires the vehicle information through wireless communications received from the vehicle 410. As previously mentioned, the vehicle information includes, in one embodiment, a GPS location of the vehicle 410, a rotation angle (e.g., at least yaw) of the vehicle 410 as obtained from an inertial navigation system (INS) or GPS/INS of the vehicle 410, and also at least an indication of the shape of the vehicle 410 (e.g., identifier of a make, model, year, etc.).

As an additional note, because vehicles may be damaged or otherwise modified from a standard shape, in one embodiment, the capture module 220 executes a lookup against a database or service that indicates accident histories and/or modification information for vehicles. Alternatively, the vehicle information acquired by the capture module 220 may also indicate an accident history, the presence of any alterations, and so on so that the capture module 220 can either ignore the nearby vehicle or modify the reference point cloud according to the noted model variations.

Furthermore, the capture module 220 also obtains perceived information of the vehicle 410 using one or more beams 440 of the LIDAR 124. Accordingly, the capture module 220 acquires data from the LIDAR 124 that is a perceived 3D point cloud of a surface of the vehicle 410 according to a current orientation.

For example, FIG. 5 is a graph 500 of relative positions of the vehicle 100 and the vehicle 410. In one embodiment, the capture module 220 obtains a GPS location from the navigation system 147 of the vehicle 100. Accordingly, the capture module 220 uses the GPS location to identify the $x_1$, $y_1$, $z_1$ coordinates of the vehicle 100. The capture module 220 uses a GPS location from the vehicle information to identify the $x_2$, $y_2$, $z_2$ coordinates of the vehicle 410. In one embodiment, the capture module 220 also fits the model of the vehicle 410 into the graph 500 according to the GPS coordinates and, for example, the yaw information. In this way, the capture module 220 generates the reference point cloud using the known information about the nearby vehicle 410.

Furthermore, the LIDAR beams 440 are illustrated with a base section 510 and an alignment section 520. The alignment section is adjusted by the calibration module 230 by changing parameters of the beams 440 that modify an angle and absolute distance. For example, the calibration module 230 compares the reference point cloud and the perceived point cloud to obtain a misalignment parameter for each of the beams 440. The calibration module 230 uses the misalignment parameter to adjust the operating parameters that control the LIDAR 124 for each of the beams 440 to calibrate the LIDAR 124 and correct the misalignment.

As further illustration of the beams of the LIDAR 124, consider FIG. 6. FIG. 6 is a diagram of the separate beams 440 of the LIDAR 124. The LIDAR 124 is illustrated in FIG. 6 as producing five separate beams 600a, 600b, 600c, 600d, and 600e; however, it should be appreciated that in other embodiments the number of beams may be a greater or lesser number than illustrated and discussed herein. Accordingly, the separate beams of the LIDAR 124 are each associated with a separate section of a 3D point cloud produced by the LIDAR 124. Thus, misalignment parameters may be produced for each separate one of the beams so that the beams 440 can be individually calibrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the calibration system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the calibration system 170, and/or the autonomous driving module(s) 160 may control some or all of these vehicle systems 140 and, thus, may be partially or fully autonomous.

The processor(s) 110, the calibration system 170, and/or the autonomous driving module(s) 160 can be operatively connected to communicate with the various vehicle systems 140 and/or individual components thereof. For example, returning to FIG. 1, the processor(s) 110, the calibration system 170, and/or the autonomous driving module(s) 160 can be in communication to send and/or receive information from the various vehicle systems 140 to control the movement, speed, maneuvering, heading, direction, etc. of the vehicle 100. The processor(s) 110, the calibration system 170, and/or the autonomous driving module(s) 160 may control some or all of these vehicle systems 140.

The processor(s) 110, the calibration system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the calibration system 170, and/or the autonomous driving module(s) 160 can control the direction and/or speed of the vehicle 100. The processor(s) 110, the calibration system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the calibration system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A calibration system for calibrating a sensor of a first vehicle, the sensor being a light detecting and ranging (LIDAR) sensor, the calibration system comprising:
one or more processors;
a memory communicably coupled to the one or more processors and storing:
a capture module including instructions that when executed by the one or more processors cause the one or more processors to, in response to detecting that a second vehicle is proximate to the first vehicle, acquire perceived information from the sensor about the second vehicle, and
acquire, in the first vehicle, vehicle information about the second vehicle by wirelessly communicating with the second vehicle using vehicle-to-vehicle (V2V) communications, wherein the vehicle information identifies known characteristics of the second vehicle including at least a location of the second vehicle, and an indicator of a shape of the second vehicle; and
a calibration module including instructions that when executed by the one or more processors cause the one or more processors to compare the perceived information with a reference point cloud derived from the vehicle information to generate an offset that characterizes a variance within the perceived information produced by the sensor, and
wherein the calibration module includes instructions to adjust the sensor according to the offset to correct the variance of the sensor.

2. The calibration system of claim 1, wherein the capture module further includes instructions to acquire the perceived information by controlling the LIDAR sensor to generate data about the second vehicle including at least a perceived distance from the first vehicle to the second vehicle.

3. The calibration system of claim 1, wherein the capture module further includes instructions to acquire the vehicle information about the second vehicle by querying the second vehicle for at least a portion of the vehicle information using a vehicle-to-vehicle (V2V) communication channel to receive the vehicle information from the second vehicle.

4. The calibration system of claim 1, wherein the capture module further includes instructions to acquire the vehicle information by (i) obtaining a location from a global position system (GPS) of the second vehicle and (ii) obtaining a yaw measurement from an inertial navigation system (INS) of the second vehicle, and wherein the capture module includes instructions to derive the shape of the second vehicle from an identified model of the second vehicle identified in the vehicle information.

5. The calibration system of claim 4, wherein the capture module includes instructions to generate the reference point cloud from the shape, the location, and the yaw of the second vehicle, and wherein the calibration module further includes instructions to compare the reference point cloud with a perceived point cloud from the perceived information to generate the offset, wherein the offset is a set of points that identifies a variance of points in the perceived point cloud.

6. The calibration system of claim 1, wherein the capture module further includes instructions to acquire at least a portion of the vehicle information by using at least a camera of the first vehicle to locate the second vehicle and to identify a shape of the second vehicle from a camera image when the V2V communications are unavailable.

7. The calibration system of claim 1, wherein the calibration module further includes instructions to adjust the sensor by modifying operating parameters of the sensor to alter an alignment of the sensor, and wherein the calibration module further includes instructions to modify the operating parameters by changing values of one or more registers within the sensor that store the operating parameters.

8. The calibration system of claim 1, wherein the calibration module further includes instructions to compare the perceived information and the vehicle information by comparing perceived distances of a surface of the second vehicle as identified from the perceived information with identified distances to the second vehicle determined from the vehicle information, wherein calibrating the sensor occurs as the first vehicle is operating on a roadway without intervening with operation of the first vehicle.

9. A non-transitory computer-readable medium for calibrating a sensor of a first vehicle, the sensor being a light detecting and ranging (LIDAR) sensor, and storing instructions that when executed by one or more processors cause the one or more processors to:
in response to detecting that a second vehicle is proximate to the first vehicle, acquire perceived information from the sensor about the second vehicle;
acquire, in the first vehicle, vehicle information about the second vehicle by wirelessly communicating with the second vehicle using vehicle-to-vehicle (V2V) communications, wherein the vehicle information identifies known characteristics of the second vehicle including at least a location of the second vehicle, and an indicator of a shape of the second vehicle;
compare the perceived information with a reference point cloud derived from the vehicle information to generate an offset that characterizes a variance within the perceived information produced by the sensor; and adjust the sensor according to the offset to correct the variance of the sensor.

10. The non-transitory computer-readable medium of claim 9, wherein the instructions to acquire the perceived information include instructions to control the LIDAR sensor to generate data about the second vehicle including at least a perceived distance from the first vehicle to the second vehicle.

11. The non-transitory computer-readable medium of claim 9, wherein the instructions to acquire the vehicle information about the second vehicle include instructions to query the second vehicle for at least a portion of the vehicle information, and wherein the instructions to acquire the vehicle information include instructions to communicate with the second vehicle using a vehicle-to-vehicle (V2V) communication channel to receive the vehicle information from the second vehicle.

12. The non-transitory computer-readable medium of claim 9, wherein the instructions to acquire the vehicle information include instructions to (i) obtain a location from a global position system (GPS) of the second vehicle and (ii) obtain a yaw measurement from an inertial navigation system (INS) of the second vehicle, and wherein the instructions to acquire the vehicle information include instructions to derive the shape of the second vehicle from an identified model of the second vehicle within the vehicle information.

13. The non-transitory computer-readable medium of claim 12, wherein the instructions to acquire the vehicle information include instructions to generate the reference point cloud from the shape, the location, and the yaw measurement of the second vehicle, and wherein the instructions to compare include instructions to compare the reference point cloud with a perceived point cloud from the perceived information to generate the offset, and wherein the offset is a set of points that identifies a variance of points in the perceived point cloud.

14. A method of calibrating a sensor of a first vehicle, the sensor being a light detecting and ranging (LIDAR) sensor, comprising:
in response to detecting that a second vehicle is proximate to the first vehicle, acquiring perceived information from the sensor about the second vehicle;
acquiring, in the first vehicle, vehicle information about the second vehicle by wirelessly communicating with the second vehicle using vehicle-to-vehicle (V2V) communications, wherein the vehicle information identifies known characteristics of the second vehicle including at least a location of the second vehicle, and an indicator of a shape of the second vehicle;
comparing the perceived information with a reference point cloud derived from the vehicle information to generate an offset that characterizes a variance within the perceived information produced by the sensor; and
adjusting the sensor according to the offset to correct the variance of the sensor.

15. The method of claim 14, wherein acquiring the perceived information includes controlling the LIDAR sensor to generate data about the second vehicle including at least a perceived distance from the first vehicle to the second vehicle.

16. The method of claim 14, further comprising:
acquiring the vehicle information about the second vehicle by querying the second vehicle for at least a portion of the vehicle information, wherein acquiring the vehicle information includes communicating with the second vehicle using a vehicle-to-vehicle (V2V)

communication channel to receive the vehicle information from the second vehicle when the V2V communications are unavailable.

17. The method of claim 14, further comprising:
acquiring the vehicle information by (i) obtaining a location from a global position system (GPS) of the second vehicle and (ii) obtaining a yaw measurement from an inertial navigation system (INS) of the second vehicle, and wherein the shape of the second vehicle is derived from an identified model of the second vehicle.

18. The method of claim 17, wherein acquiring the vehicle information further includes generating the reference point cloud from the shape, the location, and the yaw measurement of the second vehicle, wherein comparing the perceived information and the vehicle information includes comparing the reference point cloud with a perceived point cloud derived from the perceived information to generate the offset, and wherein the offset is a set of points that identifies a variance of points in the perceived point cloud.

19. The method of claim 14, wherein adjusting the sensor includes modifying operating parameters of the sensor to alter an alignment of the sensor, wherein modifying the operating parameters includes changing values of one or more registers within the sensor that store the operating parameters, and wherein calibrating the sensor occurs as the first vehicle is operating on a roadway without intervening with operation of the first vehicle.

20. The method of claim 14, wherein comparing the perceived information and the vehicle information includes comparing perceived distances of a surface of the second vehicle as identified from the perceived information with identified distances to the second vehicle determined from the vehicle information.

* * * * *